Aug. 16, 1960   F. R. SWANSON ET AL   2,949,063
MILLING MACHINE
Filed Dec. 31, 1956   4 Sheets-Sheet 2

INVENTORS.
Fred R. Swanson
Sterling A. Hanson
BY Schroeder, Hofgren,
Brady & Wegner
Attys.

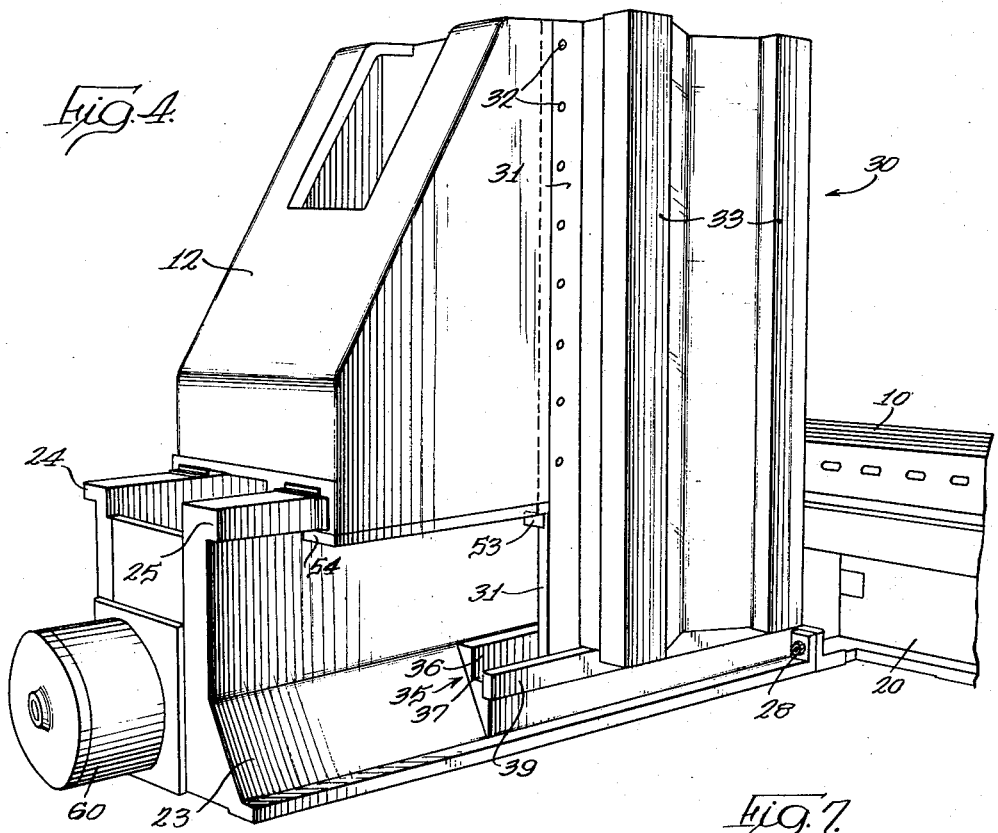
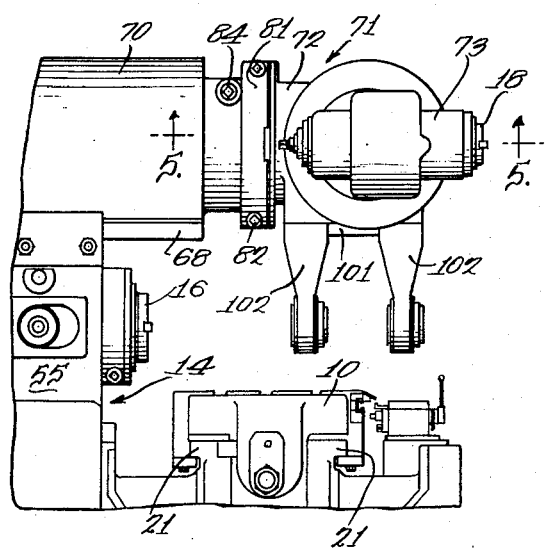
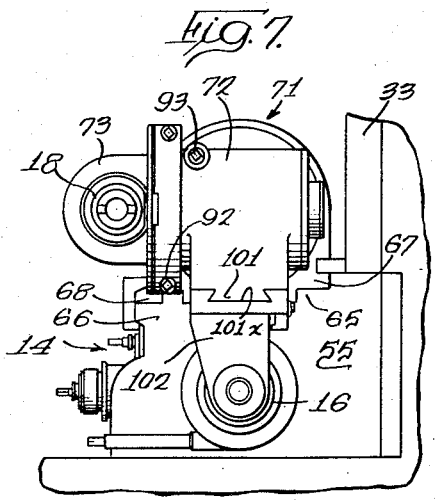

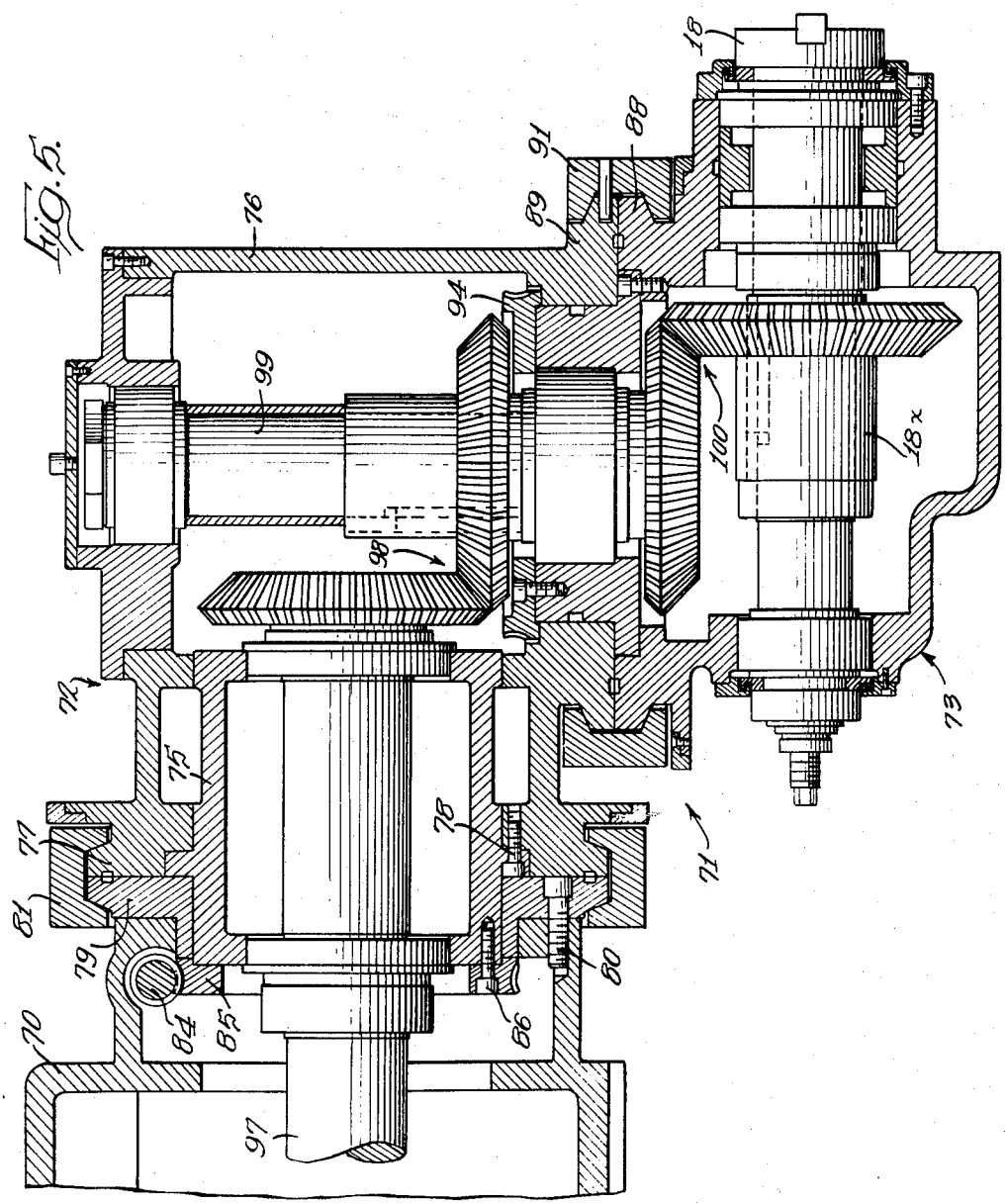

UNITED STATES PATENT OFFICE

2,949,063
MILLING MACHINE

Fred R. Swanson and Sterling A. Hanson, Rockford, Ill., assignors to Sundstrand Corporation, a corporation of Illinois Filed Dec. 31, 1956, Ser. No. 631,886

6 Claims. (Cl. 90—11)

This invention relates to machine tools and particularly to milling machines.

It is a general object of the invention to provide a new and improved milling machine structure.

Another object is to provide a new and improved milling machine which incorporates the advantages of stability and rigidity of bed type machines in heavy milling operations for long periods of time and in production quantities, which incorporates the advantages of flexibility and versatility common to knee type milling machines, and wherein a spindle head is mounted for a plurality of movements effective to take a cutting tool, often the lighter element, to the work, the heavier element.

In milling machines having a horizontally reciprocable work table, a column mounted for movement horizontally toward and away from the work table, and a spindle head or headstock mounted on the column for vertical movement, considerable difficulty has been encountered in mounting the column on the machine base and in mounting the spindle head on the column in a manner to obtain a maximum range of movement for the head and at the same time insure that both the column and head are rigidly supported against movement during milling operations.

With the above and other considerations in mind, it is a more specific object of the invention to provide, in a milling machine, a new and improved column structure which is movable horizontally and provided with a novel arrangement of ways for supporting a spindle head for movement vertically on the column.

Another object is to provide, in a milling machine, a new and improved column mounting and guide structure for supporting a column for movement toward and away from a work table and for supporting the column rigidly against movement during milling operations.

A further object is to provide, in a milling machine, a new and improved spindle head mounting and guide structure which provides a maximum range of movement for the spindle head in at least two directions relative to a work supporting table, and which supports the spindle head rigidly against the tendency to move during milling operations due in part to the disposition of the weight of the machine parts and due also to forces set up during milling operations.

It is also an object of the invention to provide a new and improved headstock construction including a spindle head having a horizontally disposed cutter spindle, an overarm supported on the spindle head, and a tool head on the overarm including a universally mounted spindle, wherein the universal spindle and overarm are adjustable to out-of-the-way positions which permit use of the horizontal spindle in face milling operations without requiring removal of the universal head or the overarm from the machine.

Another object is to provide a new and improved tool head or headstock construction including a spindle head having a horizontally mounted cutter spindle, and an overarm structure mounted on the spindle head including an all angle spindle head and mounting means for arbor supports for use in arbor milling with the horizontal spindle.

Other objects and advantages will become readily apparent from the following detailed description taken in connection with the accompanying drawings, in which:

Fig. 4 is a rear perspective view of the milling machine, with the headstock removed from the vertical ways on which it is slidable, with the headstock drive means removed, and with the column drive motor removed;

Fig. 5 is an enlarged fragmentary sectional view of the universal spindle head, taken at about the line 5—5 of Fig. 6.

Fig. 6 is a fragmentary side elevational view of the machine as illustrated in Fig. 1, illustrating the mounting of arbor supports on the universal head; and Fig. 7 is a fragmentary front elevational view of the machine as illustrated in Fig. 6.

Figure 1:
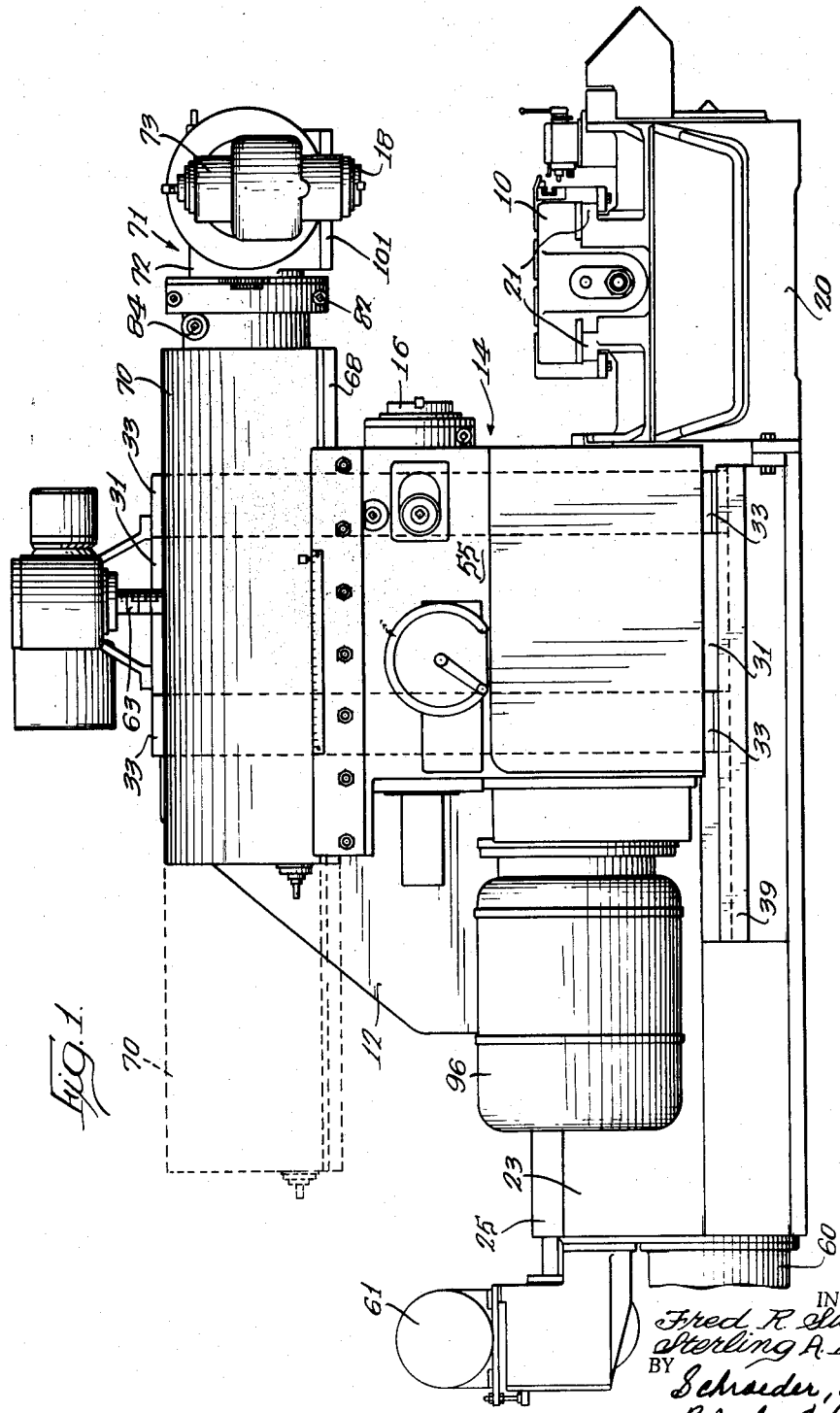
Fig. 1 is a side elevational view of a milling machine embodying the principles of the present invention.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings, and particularly to Figs. 1 through 4, as illustrated, the invention is embodied in a milling machine including a reciprocable work table 10, a column 12 reciprocable toward and away from the table 10, and a headstock structure 14 reciprocable vertically on the column 12. The headstock 14 includes a main, horizontally disposed tool spindle 16 and a second tool spindle 18 mounted for universal adjustment.

The work table 10 is supported by means of an elongated table base 20 which is provided on its top surface with spaced parallel longitudinally extending guides 21. The table 10 is provided with guideways cooperating with the guides 21 and mounting the table for reciprocable movement longitudinally. As in bed type machines, the base 20 may be of a sufficient length to underlie the entire length of the table 10 throughout its entire stroke so as to provide a rigid support of the table.

The column 12 is supported by means of a hollow elongated base structure 23 which extends laterally from the table base in a direction normal to the direction of table movement. The column base 23 is provided at its top with a pair of spaced parallel guides 24 and 25 which extend the length of the base, toward and away from the table 10. The top surfaces of the guides 24 and 25 are disposed substantially at the level of the top surface of the table 10. As seen best in Fig. 2, the column 12 is provided with guideways 24x and 25x cooperating with the guides 24 and 25 respectively to mount the column for movement toward and away from the work table. The column guideways include bronze metal inserts 26 and 27 which engage respectively the top surfaces of the guides 24 and 25.

The table base 20 and the column base 23 are preferably formed separately, and rigidly connected together during assembly of the machine. As illustrated, the column base 23 is bolted to the table base 20 by a plurality of bolts such as the one seen at 28 in Fig. 4 and illustrated in section in Fig. 2. Other bolts for connecting the two bases together are seen in section at 29 in Fig. 2.

In order to provide means for mounting the headstock 14 for vertical movement on the column 12, the column includes a saddle-like structure 30 (Fig. 4) which is fixed to one side of the column. The saddle structure 30 is in the form of a heavy rigid plate 31 vertically disposed at one side of the column 12 and secured to the column by means such as the bolts seen at 32 in Figs. 2 and 4. The plate 31 extends from the top of the column 12 downwardly alongside the column, and well below the column and below the surface of the worktable 10, extending downwardly along one side of the column base 23 to a position near the bottom of the base 23 and near the bottom of the work table base 20.

The plate 31 is provided with integral spaced parallel vertical guides 33 which extend substantially the entire length of the plate 31. The guides 33 are provided for mounting the headstock 14 for vertical movement on the column. The arrangement of the guides 33 to extend downwardly below the surface of the work table enables mounting of the headstock for a maximum range of movement, while at the same time affording a positive support to prevent movement of the headstock during milling operations.

The bottom ends of the vertical guides 33 are supported against flexure by cooperating guide means provided on the saddle structure 30 and on the column base 23. As illustrated, this cooperating guide means includes a slideway 35 (Fig. 4) provided on the side of the base 23 near the bottom of the base and extending in a direction parallel to the column movement. The slideway 35 is formed by means of a vertical guide surface 36 and a horizontal guide surface 37 provided on the base, and a vertical guide surface 38 provided by means of a plate 39 which may be bolted or otherwise rigidly secured to the side of the base 23. The surfaces 36, 37 and 38 cooperate to form the slideway 35 in the shape of a channel.

The lower end of the saddle structure 30 is provided with a guide 40 fitting closely in the slideway 35 and provided with bronze metal inserts 41 and 42 slidably engaging the vertical surfaces 36 and 38 respectively. The cooperating guide 40 and slideaway 35 serve to support the lower end of the saddle structure for slidable movement toward and away from the work table, and also serve to rigidly maintain the lower end of the saddle structure against lateral movement during milling operations.

It will be appreciated that the mounting of the headstock 14 on the side of the column 12 in order to obtain a maximum range of movement also disposes the weight of the headstock in a position which does not overlie the column and the column base, but instead is to one side of the column. Thus, there is a tendency for the weight of the headstock to tilt or roll the column off the column base. Also, during milling operations, a torque is developed about the axis of the tool spindle, the horizontal spindle 16, for example, and the tendency of such a torque is to rotate the column about the axis of the spindle. The slideway 35 and the guide 40 cooperate with other guide means on the column and the column base to slidably support the column for movement relative to the work table, and also to support the column rigidly on the base against movement during milling operations due either to the disposition of weight or to forces set up during operation.

The other guide means referred to includes the guide 24 which supports the column slidably on the column base 23. The guide 24 includes an outer vertical surface 44 (Fig. 2) which is engaged by a depending flange portion 45 on the column. Also, the guide 24 includes a bottom surface 46 which is engaged by a plate 47 bolted or otherwise rigidly secured to the depending flange 45. The slideway 35 and guide 40 are laterally spaced (Fig. 2) as widely from the guide 24 and its cooperating guide ways as possible in order to provide a maximum moment of resistance to any tendency of the column to tilt.

Cooperating guide means, also slidably supporting the column on the base, additionally cooperate to resist any tendency of the column to twist relative to the column base, either in a horizontal plane parallel to the axis of the spindle 16 or in a vertical plane parallel to the axis of the spindle 16. Such tendencies of the column to twist occur particularly on engagement of a cutting tool with the work. Guide means for this purpose are as closely spaced as possible and as long as possible.

In order to prevent horizontal twisting, the guide 25 on the column base is provided with a vertical side surface 50 which is engaged by an adjustable gib 51 carried by the column. In opposition to the engagement of the surface 50 and the gib 51, an opposite vertical surface 52 on the guide 25 is engaged by a back surface on the saddle structure mounting plate 31.

The top of the guide 25 and the bronze insert 27 cooperate to prevent vertical twisting of the column. In opposition to engagement of the guide 25 and the insert 27, the saddle structure mounting plate is provided with a support 53 for an adjustable gib 54 having its upper surface engaging the bottom surface of the guide 25.

The headstock 14 includes a main spindle head 55 in the form of a hollow housing which rotatably supports the main spindle 16. The head 55 is provided at one side with spaced parallel guide ways 56 which slidably receive the vertical guides 33 of the saddle structure to mount the spindle head for vertical movement. The axis of the spindle 16 is located at a position between the opposite ends of the guide ways 56 in order to provide rigid support of the spindle head against movement. As viewed in Fig. 2, the spindle head 55 may be moved either upwardly or downwardly from the position illustrated. The range of movement provided by the construction illustrated is such that the axis of the spindle 16 may be lowered almost to the top of the work table 10. The spindle 16 may be utilized for horizontal milling, arbor milling, and face milling of vertical surfaces.

Movements of the table 10, column 12, and the spindle head 55 are effected by means of separate electric motor drives for each of the elements. Movement of the table 10 is effected by means of a table drive motor 60 mounted at the back end of the column base 23 and connected to a drive mechanism, which may be of conventional construction, and connected in turn with the table 10. Movement of the column is effected by means of a column drive motor 61 (Fig. 1) mounted on the column base and connected by suitable drive means to the column 12. (The column drive motor 61 has been omitted from Fig. 4 in order to better illustrate the way construction.) Column movement may be for purposes of adjustment or for feed. Movement of the spindle head 55 is effected by means of a drive motor 62 (Figs. 2 and 3) mounted on the column and connected by reduction gearing to drive a rotatable feed shaft 63 having a threaded connection with the spindle head.

Referring now also to Figs. 5, 6 and 7, the top of the spindle head 55 is provided with spaced parallel guideways 65 (Figs. 2 and 7) and 66 (Fig. 7). The guideways 65 and 66 slidably receive cooperating guide portions 67 and 68 provided on an overarm structure 70 mounted atop the spindle head. The overarm is thereby mounted parallel to the spindle 16 and for adjustment longitudinally.

The overarm 70 carries a tool head structure 71 including the universally adjustable spindle 18. The tool head 71 includes a first housing 72 which is mounted against the end of the overarm 70 for 360° adjustment about an axis parallel to the axis of the spindle 16. A second housing 73 is mounted on the first housing for 360° adjustment about an axis normal to the axis of adjustment of the housing 72. The second housing 73 carries the second spindle 18 which is mounted for rotation about an axis normal to the axis of adjustment for the second housing. The spindle 18 is thereby mounted in a manner suitable for use in vertical milling, in face milling horizontal surfaces, and in angular milling at any desired angle.

Referring now principally to Fig. 5, the first housing 72 includes a first hollow cylindrical body 75 having an axis parallel to the axis of the spindle 16, and a second hollow generally cylindrical body 76 which is rigidly secured to the first body 75 and has its axis normal to the axis of the first body. The first body 75 is provided with an axially facing annular flange 77 secured thereto as by screws 78, and abutting against an opposed annular flange 79 secured to the overarm 70 as by screws 80. The flanges 77 and 79 are held in abutting relationship by means of a clamping ring 81 which extends around the outside of the flanges and has a generally U-shaped cross section which embraces the flanges. Split end portions of the clamping ring 81 may be tightly drawn together or separated by means of a clamping screw 82 (Figs. 1 and 6). When the clamping ring is released, adjustment of the first housing 72 relative to the overarm may be effected by means of a worm 84 (Fig. 5) rotatable in the overarm and engaging a worm gear 85 secured to the body 75 as by screws 86.

Figure 2:
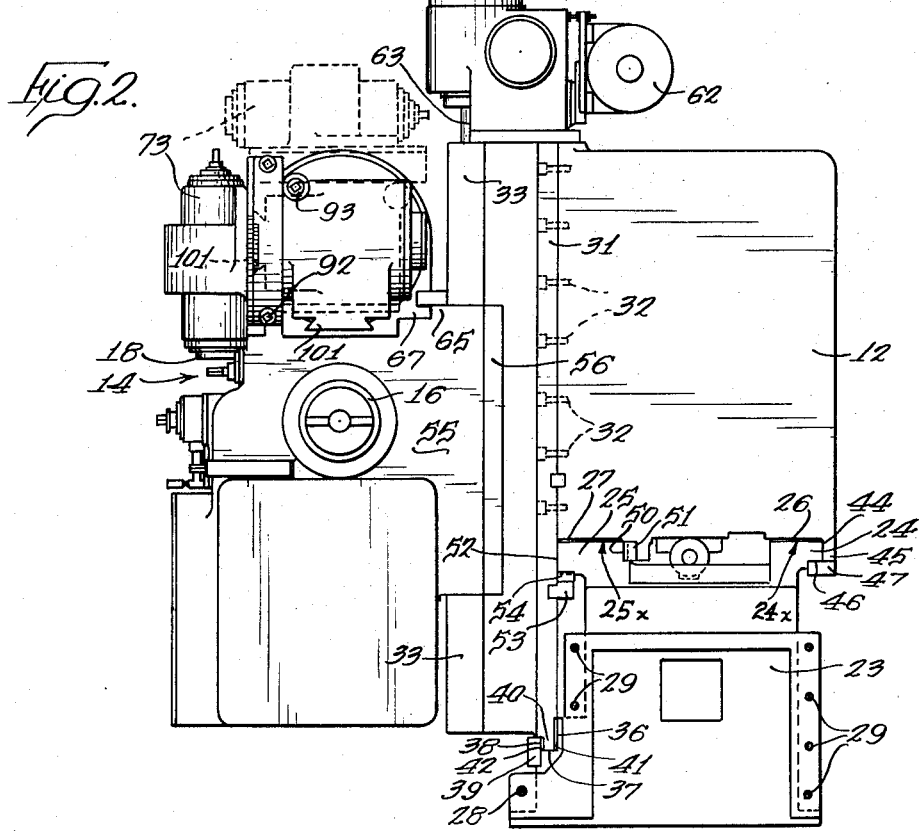
Fig. 2 is a front elevational view of the machine illustrated in Fig. 1, with the work supporting table omitted in order to illustrate other details.
Figure 3:
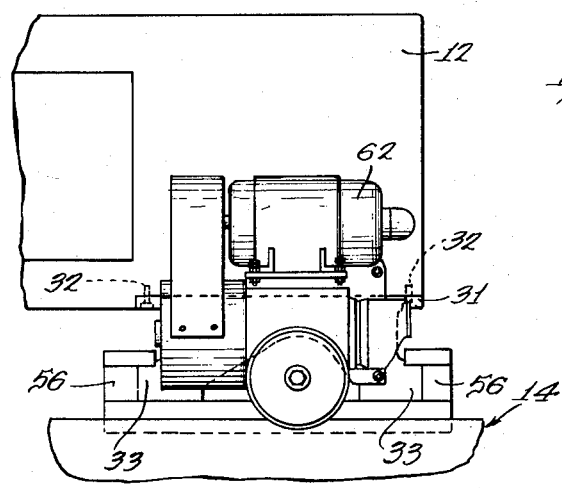
Fig. 3 is a fragmentary top plan view of the machine as illustrated in Fig. 2.

The second housing 73 is also formed of a generally hollow body having an integral annular flange 88 which abuts against a flange 89 on the body 76. The flanges 88 and 89 are held together by, and may be clamped in adjusted positions by, a clamping ring 91 similar to the clamping ring 81 and controlled by a clamping screw 92 (Figs. 2 and 7). Adjustment of the housing 73 relative to the housing 72 may be effected by means of a worm 93 (Fig. 7) rotatable in the body 76 and engaging a worm gear 94 secured to the housing 73.

The spindles 16 and 18 are driven from a common power drive source including an electric motor 96 (Fig. 1) connected by gearing (not shown) to the spindle 16. The spindle 18 may be driven by gearing from the spindle 17 including a drive shaft 97 (Fig. 5) rotatable in the overarm 70 and the body 75. The shaft 97 is connected by beveled gearing 98 to drive an intermediate shaft 99 connected in turn by beveled gearing 100 to drive the shaft 18x of the spindle 18.

In order to provide a support means for arbor supports to be used in arbor milling with the horizontal spindle 16, the under surface of the first housing 72 is provided with a downwardly facing dovetail guide 101. The guide 101 extends parallel to the spindle 16 and by adjustment of the housing 72 may be positioned, as illustrated in Figs. 6 and 7 particularly, to receive arbor supports such as those illustrated at 102. The arbor supports are provided with guide ways 101x which mate with the dovetail 101 and are provided at the lower ends with journals suitable for supporting outboard portions of a tool arbor.

As best illustrated in Fig. 2, when the arbor supports 102 are removed, and it is desired to face mill vertical surfaces with the horizontal spindle 16, the second housing 73, supporting the second spindle 18, may be adjusted to an overhead position as illustrated by the broken line showing in Fig. 2. With the housing 73 adjusted to the broken line position, the overarm may then be adjusted to a retracted out-of-the-way position so that none of the overarm structure or the tool head or housing structure overhangs the end of the spindle 16. A retracted position of the overarm is indicated by broken lines in Fig. 1. These parts are thereby adjusted to out-of-the-way positions which in no way interfere with work on the table 10 or with a face milling tool on the spindle 16 to permit face milling without the necessity of removing the overarm or the second tool spindle entirely from the machine.

It should now be apparent that we have provided an improved milling machine structure which accomplishes the objects previously set forth and provides many advantages over the prior art.

We claim:

1. In a milling machine, in combination, a first base portion, a work table reciprocable longitudinally on said first base portion, a second base portion extending laterally from the first base portion in a direction normal to the length of the first base portion, a column slidable on the second base portion toward and away from the work table and extending upwardly from the level of the work table, a pair of parallel vertically elongated guides fixed on one side of said column, spaced apart in the direction of the length of the second base portion, and extending in a vertical direction from a position near the top of the column to a position below the top of the work table and near the bottom of the second base portion, for slidably receiving a spindle head for vertical movement on the guides, and a guideway on said one side of the second base portion extending toward and away from the first base portion, slidably supporting the lower ends of said guides.

2. A milling machine, comprising, in combination, a first base, a work table reciprocable on said first base, a second base, extending laterally from the first base in a direction normal to the direction of table movement, a column slidable on the second base toward and away from the work table and extending upwardly above the level of the work table, a pair of parallel vertically extending guides fixed along one side of said column, spaced apart horizontally, and reaching from a position above the level of the work table to a position below the level of the table top and near the bottom of the second base, a spindle head having guide ways fitted on said guides and mounting the spindle head for slidable movement vertically on the guides, a tool spindle rotatable in the spindle head having its axis parallel to the length of the second base and spaced between the ends of said guide ways, and a guideway on said second base near the bottom and extending toward and away from the first base for slidably supporting the lower ends of said guides against flexure during milling operations.

3. In a milling machine having a reciprocable work supporting table, in combination therewith, a base alongside the work table, guide means atop the base including an elongated guide adjacent one side of the base and extending normal to the direction of table movement, a column mounted on the guide means for movement toward and away from the work table, a pair of spaced parallel vertical guides fixed on one side of the column, having their upper ends spaced above the level of the work table and extending downwardly below the top of the base along the side of said base opposite from said guide to a position below the top level of the work table, a spindle head mounted on the parallel guides for vertical sliding movement and having a rotary tool spindle, a slideway on said opposite side of the base below the top level of the base extending toward and away from the work table, and cooperating surfaces on the column and on said guide and said slideway slidably engaged to permit slidable movement of the column on the base and abutting to prevent movement of the column due to torque about the spindle axis during milling operations.

4. A milling machine, comprising, a table base, a work table reciprocable on the base, a column base, a pair of spaced parallel guide ways on the top of the column base, one adjacent each side of the base, and normal to the direction of table movement, a column sildable on the guide ways toward and away from the table, a saddle structure fixed on one side of the column including a pair of spaced parallel vertical guides having their upper ends above the level of the table and extending downwardly along one side of the column base to a position near the bottom of both bases, a spindle head slidable vertically on said guides and having a tool spindle parallel to the direction of column movement, a slideway on said one side of the column base near the bottom of the base, a horizontal guide on said saddle structure slidable in said slideway, cooperating surfaces on said column and on the guide way adjacent said one side of the column base slidably engaged to permit slidable movement of the column and abutting to prevent twisting movement of the column on the base in either a horizontal or a vertical plane, and cooperating surfaces on said slideway and horizontal guide, and on said column and on the guide way adjacent the side of the column base opposite from said one side, slidably engaged to permit slidable movement of the column and abutting to prevent movement of the column due to the weight of the spindle head and due to torque about the spindle axis during milling operations.

5. In a milling machine having a table base, a work table reciprocable on the table base, a column base, and a column reciprocable on the column base toward and away from the table, a saddle structure fixed to one side of the column including spaced parallel vertical guides extending below the top level of the table and below the top level of the column base, cooperating guide means on the side of the column base and on the saddle structure near its bottom permitting slidable movement of the column and preventing flexure of the saddle structure during milling operations; and a headstock slidable vertically on the guides.

6. A milling machine, comprising, a table base, a work table slidable on the base, a column base, a pair of spaced parallel guides on the column base, one adjacent each side of the base and extending normal to the direction of table movement, a column slidable on the guides toward and away from the table, a saddle structure fixed on one side of the column including a pair of spaced parallel vertical guides having upper ends above the level of the table and lower ends extending downwardly along one side of the column base to a position below the top level of the table, a headstock slidable vertically on said vertical guides including a tool spindle parallel to the direction of column movement, a slideway on said one side of the column base near the bottom of the base, a horizontal guide on said saddle structure slidable in said slideway, cooperating surfaces on said slideway and horizontal guide and cooperating surfaces on said column and on the base guide adjacent the side of the column base opposite from said one side slidably engaged to permit slidable movement of the column and abutting to prevent movement of the column due to the weight of the headstock, and cooperating surfaces on said column and on the base guide adjacent said one side of the column base slidably engaged to permit slidable movement of the column and abutting to prevent twisting movement of the column on the base in either a horizontal or a vertical plane due to engagement of a cutter with work on said table.

References Cited in the file of this patent

UNITED STATES PATENTS

| | | |
|---|---|---|
| 1,965,224 | Ernst et al. | July 3, 1934 |
| 2,320,776 | Gorton | June 1, 1943 |
| 2,605,678 | Armitage et al. | Aug. 5, 1952 |
| 2,667,105 | Stephan | Jan. 26, 1954 |

FOREIGN PATENTS

| | | |
|---|---|---|
| 1,062,000 | France | Dec. 2, 1953 |